April 18, 1933. F. SCHMIED 1,904,803
AUTOMATIC LUBRICATING DEVICE
Filed March 18, 1932 2 Sheets-Sheet 1
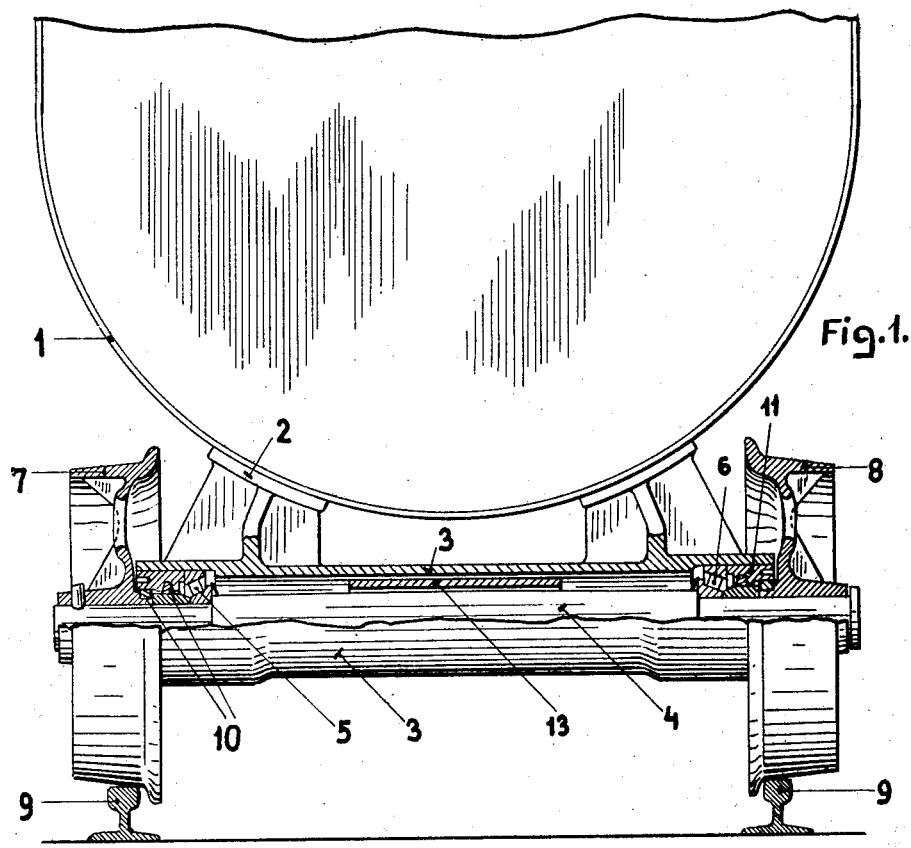
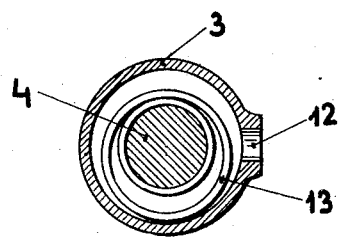
Inventor
Franz Schmied
by Howard A. Coombs, Atty.

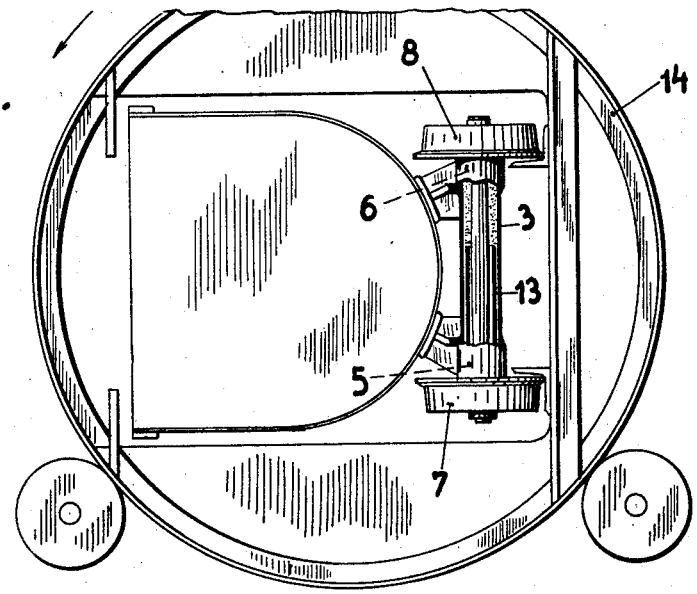
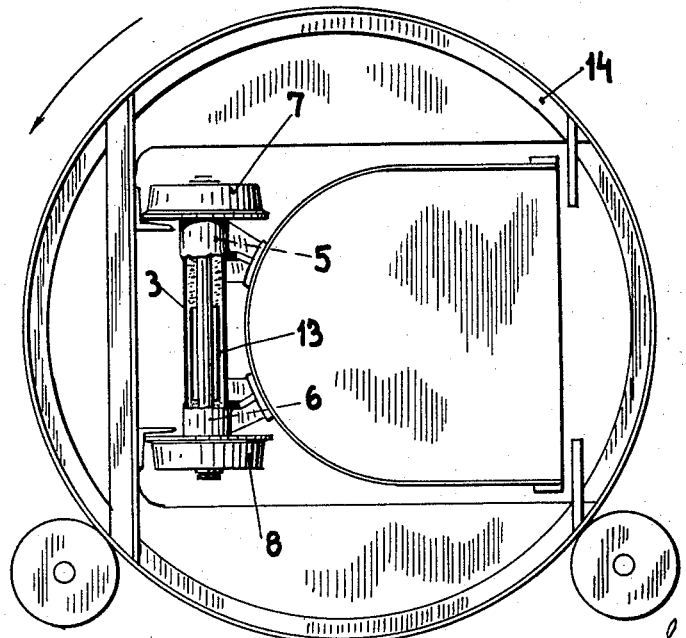

UNITED STATES PATENT OFFICE

FRANZ SCHMIED, OF TEPLITZ-SCHONAU, CZECHOSLOVAKIA

AUTOMATIC LUBRICATING DEVICE

Application filed March 18, 1932, Serial No. 599,774, and in Czechoslovakia June 11, 1931.

This invention relates to arrangements for lubricating the axle-bearings of mine-trams, in which lubricant in the form of viscous grease is supplied to the bearings from time to time in small quantities, such supply being arranged to be effected whenever the mine-tram undergoes a lateral tipping movement, for example when the mine tram is tipped in a rotary tipping device in order to unload the contents of the tram.

In order that the invention may be readily understood, it will now be described, by way of example, with reference to the accompanying drawings, in which Figure 1 is a view in longitudinal section of one set of wheels of a mine-tram, Figure 2 being a view in cross-section through the centre of the set of wheels shown in Figure 1, whilst Figures 3 and 4 show the mine-tram located in a rotary tipping device, illustrating the positions of the tram after being rotated through 90° and 270° respectively.

Referring now to the drawings, it will be seen that to the floor 1 of the tram support members 2 or secured, a casing 3 being secured to the lower ends of the supports 2. An axle 4 is mounted in the casing 3 through the intermediary of bearings 5 and 6, wheels 7 and 8, arranged to run on rails 9, being located on the ends of the axle 4. The bearings 5 and 6 are protected from external foreign matter by packing rings 10 located in adjustable bushings 11.

The lubrication of bearings of the kind illustrated is best effected by means of viscous grease, and in order to ensure good lubrication it is necessary that the spent grease should be replaced by fresh grease at short intervals of time.

The set of wheels is initially supplied with grease by forcing the latter into the casing 4 through the orifice 12 (Figure 2), sufficient grease being supplied in this manner to fill the interior of the casing and penetrate into the bearings 5 and 6. During the normal course of operation of the mine-tram, the bearings are lubricated only by that part of the grease which was forced into the bearings by the initial filling operation, the remainder of the grease remaining unused in the casing, since, owing to its viscosity, there is no tendency for it to flow to the bearings, and, moreover, there are no external forces tending to force it to the bearings. If the tram is left standing in the cold, the viscosity of the grease will increase and thus lessen any tendency of the grease to flow to the bearings. The invention overcome these disadvantages and provides for fresh grease to be forced intermittently from the casing 3 into the bearings to replace the spent grease.

In accordance with the invention a weight member or members, here illustrated as a tube 13, but which may consist of rods, balls, rings etc., is provided in the casing 3, so as to lie loosely around the axle 4, the operation of the tube 13 being as follows:

If the tram be tipped laterally, as will occur, for example, when it is unloaded in the rotary tipping device 14 (Figures 3 and 4), it will, after being rotated through 90°, assume a position in which the axle 4 is vertical (Figure 3). In this position, the weight of the tube 13, which is now resting on the grease contained in the lower end of the casing, forces the grease towards the wheel 7 and into the bearing 5. After a further rotation of the tram through 180°, that is to say, a total rotation through 270°, the axle 4 is again vertical (Figure 4), and grease is now forced into the bearing 6, the tube 13 moving away from the bearing 5 and falling towards the wheel 8.

It will be evident that in this manner fresh grease is forced into the bearings of all the wheels of the tram during a complete rotation of the latter, whenever the tram has completed its journey through the mine and is unloaded in the rotary tipping device, automatic lubrication of all the bearings takes place in a regular and reliable manner, so long as there is a sufficient supply of grease remaining in the casing 3. The period over which automatic lubrication will take place will depend on the amount of grease initially supplied to the casing 3, and when all the grease has been used up, the casing 3 is recharged with grease through the orifice 12 in known manner.

The pressure of the tube 13 or other weight member or members will evidently depend on the weight of the said member or members, and, in order that the weight thereof may be as large as possible, the cross-sectional area between the internal wall of the casing 3 and the axle 4 must be filled as completely as possible by the cross-sectional area of the weight member or members. This condition is readily fulfilled when rings or tubes such as the tube 13 are employed, and the weight member or members will preferably be in this form.

It may conceivably happen that the weight member or members may be to one side or the other of the centre of the axle 4 when the casing is to be refilled with grease, so that there is a large space on one side of the tube and a small space on the other side. A greater quantity of grease will, therefore, be supplied to one end of the casing than to the other during the refilling operation, with the result that during the subsequent operation of the tram the grease available for lubrication of one of the bearings becomes consumed prematurely, and efficient lubrication soon ceases.

In order to avoid this possibility and to ensure even distribution of grease to each end of the axle 4, it is necessary that the weight member or members be located centrally in the casing 3 prior to and during the refilling operation, and according to a further feature of the invention the centre of the axle is increased in diameter, a weight member of annular cross-section, such as the tube 13, being employed. The weight member loosely encircles the axle 4 in the manner of the lubricating ring used in lubricating devices of the ring type, as shown in Figure 2. During the movement of the tram the axle 4 rotates, and, owing to the increased central diameter thereof, the tube 13 will tend to rise towards the highest point of the axle and thus reach the desired central position in which it is shown in Figure 1. When the supply of grease in the casing 3 has become exhausted, and the casing is, therefore, empty, the tube 13 will be unopposed in its endeavour to attain this central position, which it will thus assume automatically when the casing is ready to be refilled with grease. The fresh grease will thus be evenly distributed to both ends of the casing 3.

By means of the invention, therefore, grease is automatically forced at regular intervals of time into each bearing of the set of wheels in small equal quantities, sufficient but economical lubrication thus being ensured.

When the casing 3 is of such a size as to contain a sufficiently large quantity of grease, once the casing has been filled several years may elapse before refilling is necessary. With new sets of wheels of normal size, accommodation for about 1.5 litres of grease can be readily provided, such an amount being sufficient for automatic lubrication over a period of several years. In this connection it must be borne in mind that a mine-tram which is in continuous use needs to be overhauled or repaired at shorter intervals of time. If refilling is effected whenever the tram is overhauled, 1.5 litres of grease will certainly last until the next inspection or repair is effected, it not being necessary to supplement this supply of grease during the intermediate period of operation. Consequently, it is not necessary to take the tram in hand for the special purpose of lubrication, it being sufficient to replenish the casing during inspection or repair.

When the invention is applied to the tram, therefore, no attention as regards lubrication is necessary during operation, the tram, however, being lubricated in a regular and reliable manner. In this connection it is expressly pointed out that it is not necessary that a rotary tipping device should be used, a small lateral tilting movement being sufficient to ensure automatic lubrication by causing the weight member or members to fall sideways and force grease towards the bearings. If, however, a rotary tipping device is employed, automatic lubrication takes place as the tram is tipped for the purpose of unloading.

Having now described my invention, what I claim as new and desire to secure by Letters Patent is:—

1. In a wheeled vehicle the combination with an axle, and wheel bearings carried by said axle, of a casing located around said axle and between said bearings and constituting a lubricant container, and a weight member in said container adapted to force lubricant from said container to the wheel bearings under the action of gravity when the axle is inclined.

2. In a wheeled vehicle the combination with an axle, and wheel bearings carried by said axle, of a casing located around said axle between said bearings and constituting a lubricant container, and a weight member adapted to slide in said container under the action of gravity when the axle is inclined, and propel lubricant from the container to the wheel bearings.

3. In a mine-tram the combination with an axle and wheel bearings carried by said axle, of a casing located around said axle between said bearings, and constituting a lubricant container, and a weight member adapted to slide in said container under the action of gravity when the tram is tilted in a tipping device, and propel lubricant from the container to the wheel bearings.

4. In a wheeled vehicle the combination with an axle and wheel bearings carried by said axle, and a casing located around said axle between said bearings and constituting a lubricant container, a weight member adapted to slide in said container under the action of gravity when the axle is inclined, and means for automatically bringing the weight member to an intermediate position between the bearings.

5. In a wheeled vehicle the combination with an axle and wheel bearings carried by said axle, of a casing located around said axle between said bearings and constituting a lubricant container, a weight member adapted to slide in said container under the action of gravity when the axle is inclined, and means for automatically bringing the weight member to a central position between the bearings.

6. In a wheeled vehicle the combination with an axle and wheel bearings, carried by said axle, of a casing located around said axle between said bearings, and constituting a lubricant container and a member located in said container and surrounding said axle, and adapted to slide in said container under the action of gravity when the axle is inclined.

7. In a wheeled vehicle a combination of an axle tapering towards its ends, wheel bearings carried by said axle, a casing located around said axle between said bearings and spaced from the axle so as to constitute a lubricant container, a weight member adapted to slide in said container under the action of gravity when the axle is inclined and propel lubricant from the container to the wheel bearings.

8. In a wheeled vehicle a combination of an axle tapering towards its ends, wheel bearings carried by said axle, a casing located around said axle between said bearings and spaced from the axle so as to constitute a lubricant container, a member located in said container and surrounding said axle and adapted to slide in said container under the action of gravity when the axle is inclined, and propel lubricant from the container to the wheel bearings.

In testimony whereof I have signed my name to this specification.

FRANZ SCHMIED.